US007134189B2

(12) United States Patent
Buenz et al.

(10) Patent No.: US 7,134,189 B2
(45) Date of Patent: Nov. 14, 2006

(54) COAXIAL CABLE CONNECTOR AND TOOL AND METHOD FOR CONNECTING A COAXIAL CABLE

(75) Inventors: Larry Buenz, Tinley Park, IL (US); Tom McNamara, Orland Park, IL (US); Tim Crawford, Country Club Hills, IL (US)

(73) Assignee: Andrew Corporation, Orland Park, IL (US)

( * ) Notice: Subject to any disclaimer, the term of this patent is extended or adjusted under 35 U.S.C. 154(b) by 313 days.

(21) Appl. No.: 10/242,060

(22) Filed: Sep. 12, 2002

(65) Prior Publication Data

US 2004/0053530 A1 Mar. 18, 2004

(51) Int. Cl.
*B23P 19/00* (2006.01)

(52) U.S. Cl. ............................ 29/748; 29/747; 29/857; 439/583; 439/433

(58) Field of Classification Search .................. 29/747, 29/748, 857; 439/583, 578, 433, 585, 586, 439/592, 593, 877, 879
See application file for complete search history.

(56) References Cited

U.S. PATENT DOCUMENTS 3,196,382 A * 7/1965 Morello, Jr. ................ 439/585
3,406,373 A * 10/1968 Forney, Jr. .................. 439/394
3,496,496 A 2/1970 Fiebel et al. .................. 333/33
3,769,703 A 11/1973 Geominy ..................... 29/628
3,783,434 A 1/1974 Ransford, III ............... 339/60
3,792,418 A 2/1974 Kailus ........................ 339/177
4,112,251 A * 9/1978 Scott ........................... 174/87
4,459,881 A 7/1984 Hughes
4,719,697 A 1/1988 Schwartzman et al. ....... 29/867
4,729,268 A 3/1988 Morrow
4,733,464 A 3/1988 Gregorac ..................... 29/867
4,770,762 A * 9/1988 Schrimm et al. ........... 204/435
4,781,602 A * 11/1988 Cobaugh ..................... 439/82
4,826,450 A 5/1989 Crane et al. ................ 439/578
5,185,500 A 2/1993 Spinner .................... 174/74 R
5,580,261 A 12/1996 Meynier ..................... 439/188
5,595,219 A 1/1997 Deuel et al. ................ 140/123
5,749,270 A 5/1998 Bourbeau
5,795,188 A 8/1998 Harwath ..................... 439/583
5,806,175 A 9/1998 Underwood ................. 29/748
5,830,009 A 11/1998 Tettinger .................... 439/578
5,888,095 A 3/1999 Hussaini
5,938,474 A 8/1999 Nelson ....................... 439/583
6,109,664 A 8/2000 Guest ......................... 285/319
6,431,911 B1 * 8/2002 Pitschi ....................... 439/583

FOREIGN PATENT DOCUMENTS

JP 07250411 A 9/1995

OTHER PUBLICATIONS

British Search Report; Date of Search Nov. 24, 2004; Application No.: GB 0524983.5; 1 page.

* cited by examiner

*Primary Examiner*—Richard Chang
(74) *Attorney, Agent, or Firm*—Barnes & Thornburg

(57) ABSTRACT

A connector for coaxial cable, and a tool and method for connecting coaxial cable. The connector may have a projection configured to extend into a channel defined by an inner conductor of the coaxial cable and to engage an inner surface of the inner conductor; and a lip configured to engage an outer surface of the inner conductor when the projection extends into the channel. The lip and the projection configured to limit the movement of the inner conductor relative to the outer conductor. The tool and method may be used to displace insulation adjacent the lead end of the inner conductor or outer conductor to facilitate connection of the connector.

11 Claims, 8 Drawing Sheets

COAXIAL CABLE CONNECTOR AND TOOL AND METHOD FOR CONNECTING A COAXIAL CABLE

The present invention relates to a connector for coaxial cable, and to a tool and method for connecting coaxial cable.

BACKGROUND

A conventional coaxial cable typically includes an inner conductor, an outer conductor, a layer of dielectric material in the form of foam or the like separating the inner and outer conductors, and an outer shield of dielectric material disposed about the outer conductor. In the field, when a connection needs to be made, the coaxial cable is often cut for purposes of securing to a connector, and then the connection is made with a connector. After the cut, access to the lead end of the inner conductor, however, may be difficult because of the foam surrounding the inner conductor. Additionally, once the securement is made, flexing or bending of the coaxial cable may cause relative movement between the inner and outer conductors of the coaxial cable, resulting in degraded electrical performance of the connector.

DETAILED DESCRIPTION OF THE DRAWINGS

Figure 1:
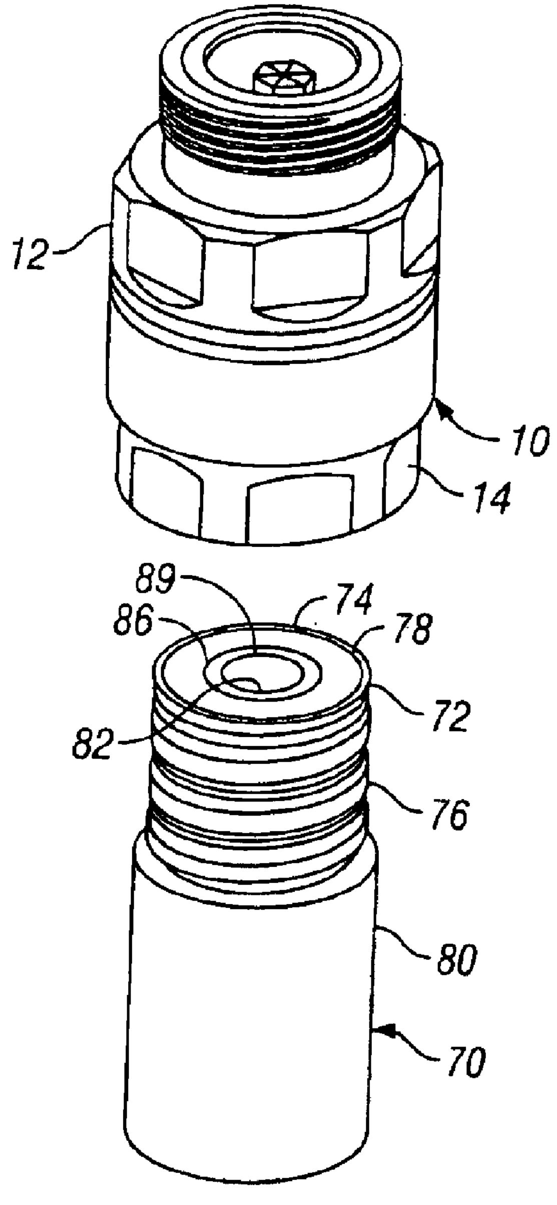
FIG. 1 is a perspective view of a connector and a coaxial cable, illustrating the coaxial cable cut to expose a lead end, its jacket stripped adjacent the lead end, and insulation displaced adjacent the lead end.
Figure 2:
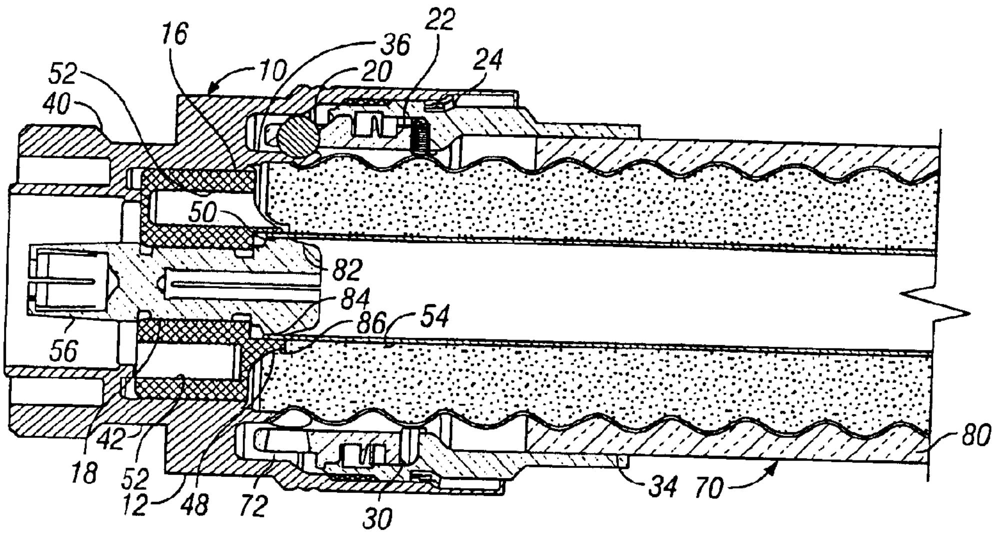
FIG. 2 is a longitudinal cross section of the connector and cable of FIG. 1 secured together.

FIGS. 1 and 2 illustrate a connector 10 for securing to a coaxial cable comprising generally a connector body 12, a clamping member 14, an insulator 16, an inner conductor contact 18, a ball bearing 20, a bearing sleeve 22 and an O-ring 24. The connector body 12 and clamping member 14 may be joined by an adhesive or the like or by any other suitable manner or may instead comprise an integral construction. The connector body 12 defines a bore 30 and the clamping member 14 defines a channel 34 in communication with the bore. The connector body 12 includes an outer conductor contact 36 having any suitable construction. The connector body 12 includes any suitable plug adapter 40 or similar structure for securing to equipment, a connector, or other cable.

The insulator 16 desirably is in the form of a generally annular sleeve 42 mounted about the inner conductor contact 18. The illustrated insulator 16 includes an annular lip 48 disposed about the inner conductor contact 18, proximal of an end of the inner conductor contact 18. The illustrated insulator 16 has a monolithic construction such that the annular sleeve 42 and the annular lip 48 are unitarily formed. The annular lip 48 and the inner conductor contact 18 define an annular void 50. The insulator 16 may define a plurality of bores 52 to achieve desired dielectric properties. The insulator 16, including the lip 48, may be constructed of any suitable insulating material.

The inner conductor contact 18 is adapted to be received by a channel defined by an inner conductor of any suitable coaxial cable, as hereinafter described. The inner conductor contact 18 may have any suitable configuration. The illustrated inner conductor contact 18, for example, comprises a projection 54 and a plug contact 56 associated with the plug adapter 40.

The illustrated connector 10 may be used with any suitable coaxial cable such as, for example, the coaxial cable 70 illustrated in FIGS. 1 and 2, that has been cut in any suitable manner to define a lead exposed end 72. The illustrated coaxial cable 70 includes an inner conductor 74, an outer conductor 76, insulation 78 separating the inner and outer conductors, and a jacket 80 disposed about the outer conductor. The illustrated jacket 80 has been stripped to expose a portion of the outer conductor 76 adjacent the lead end 72 of the coaxial cable 70. The insulation 78 comprises any suitable dielectric material such as, for example, any suitable foam or the like. In FIG. 2, the insulation 78 adjacent the lead end 84 of the inner conductor 74 has been displaced.

The illustrated connector 10 may be secured to the illustrated coaxial cable 70 in any suitable manner. For example, after the insulation 78 surrounding the lead end 84 of the inner conductor 74 is displaced, the connector 10 is pressed onto the lead end 72 of the coaxial cable 70 with the clamping member 14 engaging the jacket 78 and with the lead end of the inner conductor 74 received by the void 50. Once the connector 10 is secured to the coaxial cable 70, the annular lip 48 engages or grips the outside surface of the inner conductor 74 to limit movement of the inner conductor 74 relative to the outer conductor 76 during flexing or bending of the coaxial cable 70 and thus improves electrical performance. The projection 54 engages or grips the inside surface of the inner conductor 74 which also limits such relative movement. The illustrated projection 54 is spring-like in construction or otherwise includes any suitable radially resilient portion to radially engage the inside surface of the inner conductor 74. The projection 54 may, for example, include spring fingers.

Figure 3:
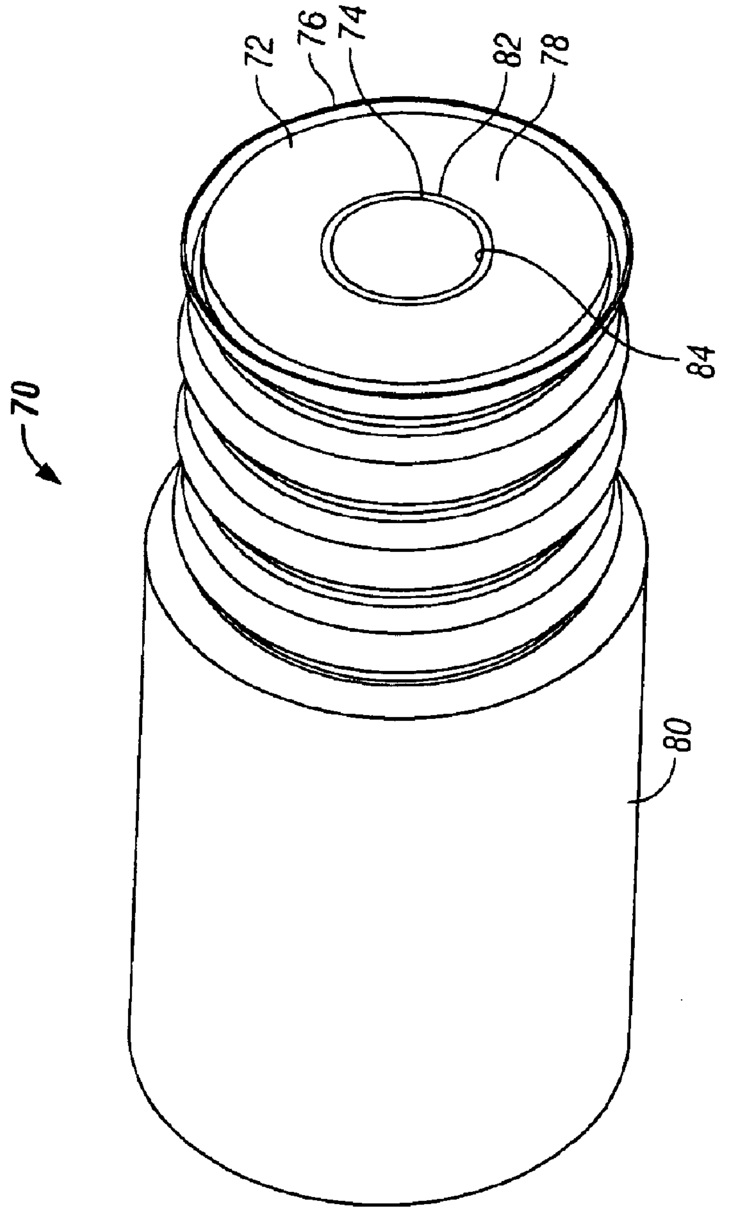
FIG. 3 is a broken perspective view of the coaxial cable of FIGS. 1 and 2 before the insulation adjacent the lead end of the inner conductor of the coaxial cable has been displaced.
Figure 4:
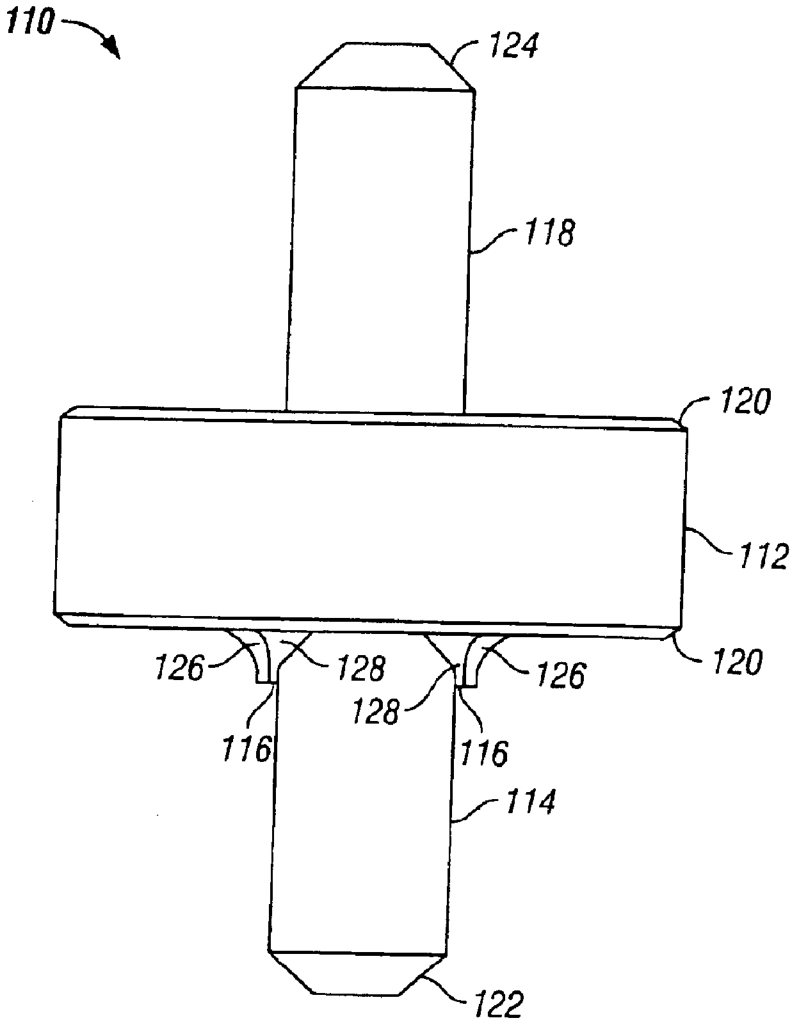
FIG. 4 is a side plan view of a tool for separating insulation from the lead end of the inner conductor of the coaxial cable.
Figure 5:
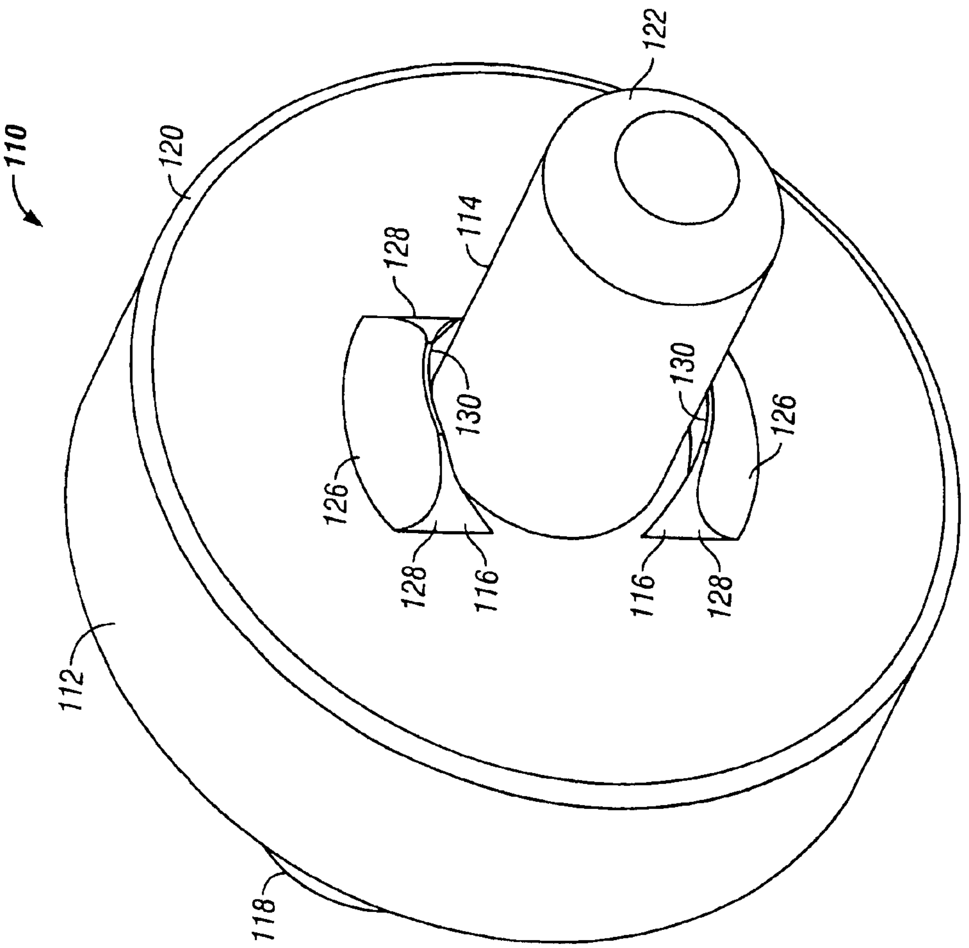
FIG. 5 is a bottom perspective view of the tool of FIG. 4.
Figure 7:
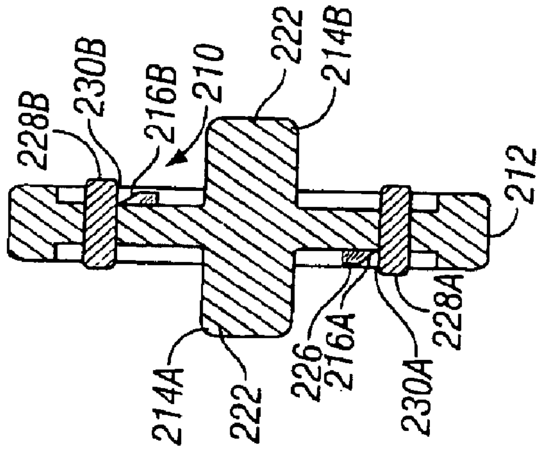
FIG. 7 is a section view taken along lines 7—7 of FIG. 6.
Figure 6:
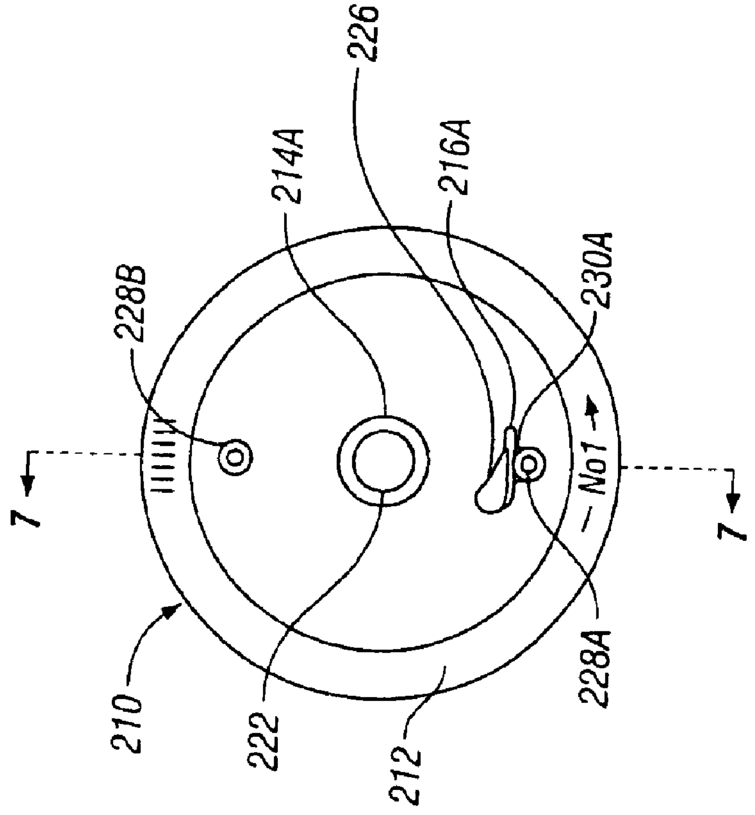
FIG. 6 is a top plan view of a tool for displacing insulation from the lead end of the outer conductor of the coaxial cable.
Figure 8:
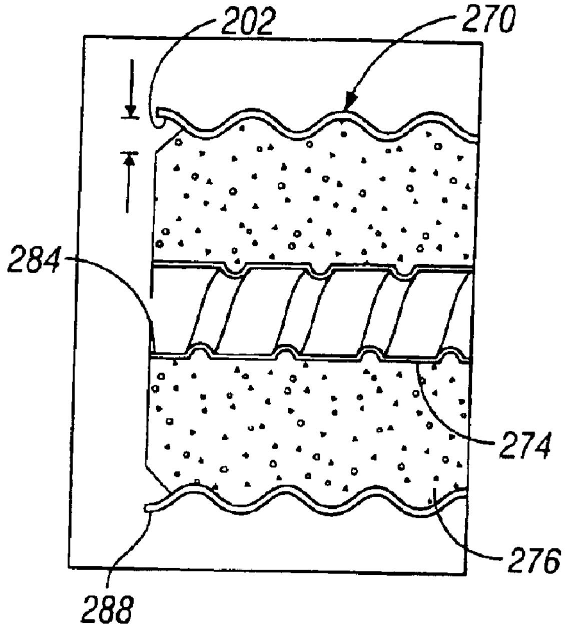
FIG. 8 is a cross section and broken view of the coaxial cable after the insulation around the inner periphery of the outer conductor has been displaced by the tool of FIGS. 6 and 7.
Figure 9:
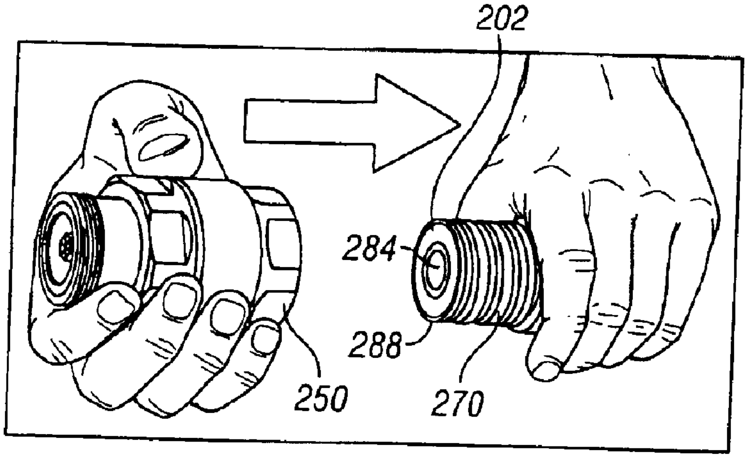
FIG. 9 is a perspective view of the coaxial cable of FIG. 8 being engaged with another embodiment of the connector.
Figure 10:
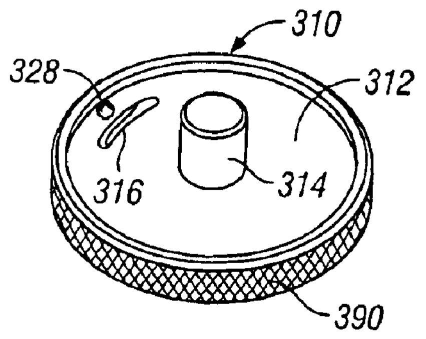
FIG. 10 is a perspective view of another embodiment of the tool for displacing insulation from the lead end of the outer conductor of the coaxial cable.
Figure 11:
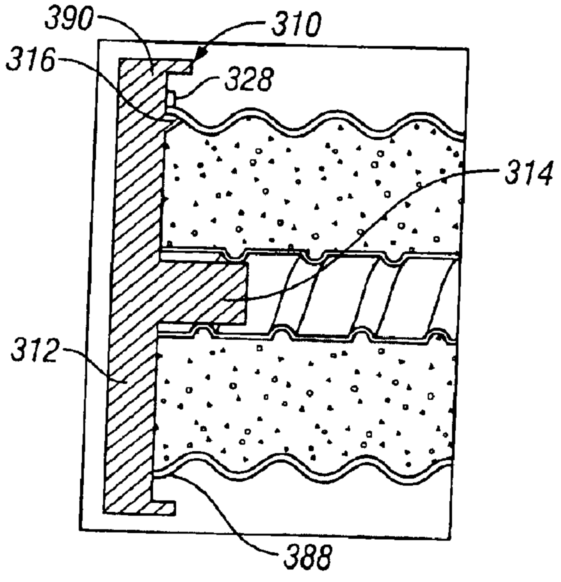
FIG. 11 is a cross section view of the tool illustrated in FIG. 10 and of the coaxial cable, illustrating the tool engaged with the coaxial cable to displace the insulation.
Figure 12:
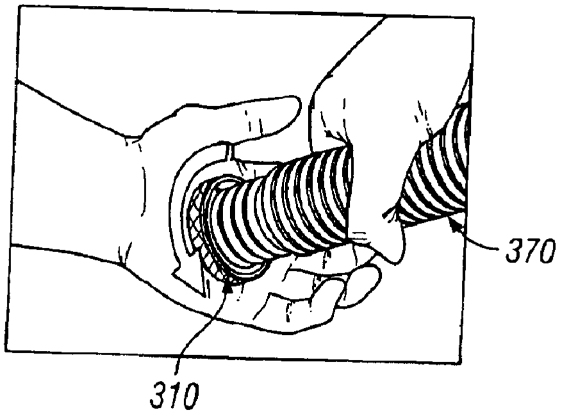
FIG. 12 is a perspective view of the tool of FIGS. 10 and 11 being rotated relative to the coaxial cable to displace the insulation.

FIG. 3 illustrates the coaxial cable of FIGS. 1 and 2 before insulation 78 adjacent the lead end 84 of the inner conductor 74 has been displaced. The insulation 78 at the lead end 84 of the inner conductor 74 may be displaced in any suitable manner, such as, for example, by the tool 110 illustrated in FIGS. 4 and 5. The illustrated tool 110 comprises a support 112, a projection 114, a pair of protrusions 116 disposed about the projection, and a handle 118. The projection 114 and the pair of protrusions 116 extend from one side of the support 112 and the handle 118 extends from the other side of the support. These components may have any suitable configuration. In the illustrated embodiment for example, the support 112 is generally disk shaped and includes beveled portions 120. The projection 114 and handle 118 are generally cylindrical and include beveled ends 122 and 124, respectively. The illustrated protrusions 116 are arcuate about the longitudinal axis of the projection 114 and are spaced apart from each other approximately 180 degrees. Each protrusion 116 includes a front wedge surface 126 and a pair of opposed lateral wedge surfaces 128. The front wedge surface 126 may incline radially inwardly as it extends from the support 112 towards the longitudinal axis of the projection 114. The lateral wedges surfaces 128 may be disposed about the front wedge surface 126 and may incline toward each other as they extend from the support 112. The projection 114 and the protrusions 116 define a pair of spaces 130 therebetween to receive the lead end 84 of the coaxial cable 70 as hereinafter described.

The illustrated tool 110 may be used to separate from the inner conductor insulation 78 surrounding the inner conductor 74 at its lead end 84 to define an annular bore 86 (see, e.g., FIG. 4) for facilitation connection of the coaxial cable 70 to any suitable equipment, connector, or coaxial cable in any suitable manner. After the coaxial cable 70 has been cut, the tool 110 may be positioned on the lead end 72 of the coaxial cable such that the projection 114 is received within the channel 82 defined by the inner conductor 74, with the protrusions 116 disposed about the outside of the lead end 84 of the inner conductor 74. The protrusions 116 push back or otherwise displace the insulation 78 adjacent the lead end 84 of the inner conductor 74. Desirably, the tool 110 is rotated as or after it is positioned on the lead end 72 of the coaxial cable 70 so that the protrusions 116 separate the insulation 78 from the inner conductor 74 around the perimeter of the lead end 84 of the inner conductor to define the bore 86. The wedge surfaces 126 and 128 facilitate the displacement of the insulation 78.

FIGS. 6–7 and 9–12 illustrate embodiments of a tool 210 and a tool 310 for displacing insulation adjacent the lead end of the inner wall of the outer conductor of the coaxial cable. In the embodiment illustrated in FIGS. 6–7, either side of the tool 210 can be engaged with the coaxial cable 270 as hereinafter described and thus may be used with coaxial cables of different dimensions, whereas the tool 310 of FIGS. 8–11 has only one side intended to be engaged with the coaxial cable.

The illustrated tool 210 comprises a support 212, a pair of projections 214A and 214B extending from opposite sides of the support, a pair of protrusions 216A and 216B extending from opposite sides of the support, and a pair of reinforcing members 228A and 228B for reforming the lead end of the outer conductor of the coaxial cable during rotation of the tool relative to the coaxial cable 270. These components may have any suitable configuration. In the illustrated embodiment, for example, the support 212 is generally disk shaped. The projections 214A and 214B are generally cylindrical and include beveled ends 222. The illustrated protrusions 216A and 216B are arcuate about the longitudinal axis of the projections 214A and 214B, and have a tear drop cross section that defines a wedge surface 226 for displacing insulation during rotation of the tool 210. The width of each protrusion 216A and 216B decreases as it extends from one end of the protrusion to the other end of the protrusion. The reinforcing members 228A and 228B are in the form of dog screws engaged with the support 212 in any suitable manner or may have any other suitable configuration. Each projection 214A and 214B and a respective one of the reinforcement members 228A and 228B define a gap 230A or 230B therebetween to receive the lead end 288 of the outer conductor 276 of the coaxial cable 270.

The tool 210 can be used with coaxial cables of different dimensions and thus the dimensions of the components can be different on each side of the support 212. In the illustrated embodiment, for example, the diameter of projection 214A is greater than the diameter of projection 214B. If desired, the protrusions 216A and 216B can be located at different radial distances relative to the longitudinal axis of the projections 214A and 214B. The tool 210 may, for example, be dimensioned so that it can be used with two coaxial cables of the same outer diameter, but having different inner conductor or outer conductor dimensions such that the diameters of the protrusions 216A and 216B are different due to the different construction of each cable. Thus, a particular tool 210, for example, may be used with coaxial cables of a specified size even though the type of coaxial cable may be different.

The tool 210 can be used to displace from the outer conductor 276 insulation 278 surrounding the inside of the outer conductor at its lead end 288 to define an annular bore 202 for facilitating connection of the coaxial cable 270 to any suitable equipment, connector, or coaxial cable in any suitable manner. After the coaxial cable 270 has been cut, the tool 210 may be positioned on the lead end 272 of the coaxial cable such that one of the projections 214A or 214B is received within the channel 282 defined by the inner conductor 274, with the respective protrusion 216A or 216B disposed about the inside of the lead end 288 of the outer conductor 276. The protrusion 216A or 216B pushes back or otherwise displaces the insulation 278 adjacent the lead end 288 of the outer conductor 276. Desirably, the tool 210 is rotated as or after it is positioned on the lead end 272 of the coaxial cable 270 so that the protrusion 216A or 216B separates the insulation 278 from the outer conductor 276 around the inside of the perimeter of the lead end 288 of the outer conductor to define the bore 202. The tear drop configuration of the protrusion 216A or 216B and its wedge surface 226 facilitate the displacement of the insulation 278.

During rotation, the reforming member 228A or 228B reforms or reshapes the lead end 288 to the extent necessary so that it has a uniform circular lead end as the lead end passes between the reforming member 228A or 228B and the protrusion 216A or 216B. The reformation is intended to reshape the lead end 288, to the extent necessary, to eliminate any irregularities in its shape that may affect the performance of the connector. The irregularities may result from, for example, the cutting of the coaxial cable, the use of the tool 210, or any other contact with the cable 270 that may occur in the field or otherwise that causes distortion or deformation of the lead end. After the tool 210 is removed, it may be desirable to brush the exposed end of the coaxial cable 270 to remove any shavings or other debris. Any suitable connector 250 can then be secured to the exposed end of the coaxial cable 270. If desired, the other side of the tool 210 can be used in the same manner with coaxial cable of different dimensions.

The tool 310 of FIGS. 8–11 is similar to the tool 210, except that only one if its sides is intended to be engaged with the coaxial cable 370. The illustrated tool 310 comprises a support 312, a projection 314 extending from the support 312, a protrusion 316 extending from the support, and a reforming member 328 for reforming the lead end 388 of the outer conductor 376 during rotation of the tool. These components may have any suitable configuration, including configurations similar to the configurations of their counterparts of tool 210. The support 312 is illustrated as having a knurled outer peripheral surface 390 to facilitate manual rotation of the tool 310 relative to the coaxial cable 370.

While preferred embodiments of the present invention are shown and described, it is envisioned that those skilled in the art may devise various modifications of the present invention without departing from the spirit and scope of the appended claims.

The claimed invention is:

1. A tool for facilitating a connection to an exposed end of a coaxial cable having an outer conductor having a lead end, an inner conductor defining a channel, and insulation disposed between the inner and outer conductors, the tool comprising:

a support;

a projection extending from the support and configured to be received by the channel of the inner conductor, the projection having a longitudinal axis;

a protrusion extending from the support and configured to displace insulation from the lead end of the outer conductor when the projection is received by the channel of the inner conductor, the protrusion being arcuate about the longitudinal axis of the projection and having an arc length of less than 90 degrees; and the support, projection and protrusion being removable from the exposed end of the coaxial cable following displacement of the insulation.

2. The tool of claim 1 wherein the projection has a longitudinal axis and the protrusion is arcuate about the longitudinal axis.

3. The tool of claim 2 wherein the protrusion includes a pair of ends, the protrusion increasing in width as it extends from one end to the other end forming a wedge surface to displace insulation during relative rotation between the tool and the coaxial cable.

4. The tool of claim 3 wherein the protrusion has a tear drop cross section.

5. The tool of claim 1 wherein the support is disk shaped and is configured to be manually rotated relative to the coaxial cable.

6. The tool of claim 5 wherein the support includes a knurled outer peripheral surface.

7. A tool for facilitating a connection to an exposed end of a coaxial cable having an outer conductor having a lead end, an inner conductor defining a channel, and insulation disposed between the inner and outer conductors, the tool comprising:

a support;

a projection extending from the support and configured to be received by the channel of the inner conductor;

a protrusion extending from the support and configured to displace insulation from the lead end of the outer conductor when the projection is received by the channel of the inner conductor;

a reforming member configured to reform the lead end of the outer conductor during relative rotation between the tool and the coaxial cable when the projection is received by the channel, the reforming member and the projection defining a gap for receiving therebetween the lead end of the outer conductor; and the support, projection and protrusion being removable from the exposed end of the coaxial cable following displacement of the insulation.

8. The tool of claim 7 wherein the reforming member is a dog screw.

9. A tool for facilitating a connection to an exposed end of a coaxial cable having an outer conductor having a lead end, an inner conductor having a lead end defining a channel, and insulation disposed between the inner and outer conductors, the tool comprising:

a support;

a projection extending from the support and configured to be received by the channel of the lead end of the inner conductor, the projection having a longitudinal axis;

a protrusion extending from the support and configured to displace insulation from the lead end of one of the outer conductor and the inner conductor when the projection is received by the channel of the lead end of the inner conductor, the protrusion being arcuate about the longitudinal axis of the projection and having an arc length of less than 90 degrees; and the support, projection and protrusion being removable from the exposed end of the coaxial cable following displacement of the insulation.

10. A tool for facilitating a connection to an exposed end of a coaxial cable having an outer conductor having a lead end, an inner conductor having a lead end defining a channel, and insulation disposed between the inner and outer conductors, the tool comprising:

a support;

a projection extending from the support and configured to be received by the channel of the lead end of the inner conductor, the projection having a longitudinal axis; and a protrusion extending from the support and configured to displace insulation from the lead end of one of the outer conductor and the inner conductor when the projection is received by the channel of the lead end of the inner conductor, the protrusion being arcuate about the longitudinal axis of the projection and extending along the longitudinal axis a distance substantially equal to the desired depth of insulation to be removed; and the support, projection and protrusion being removable from the exposed end of the coaxial cable following displacement of the insulation.

11. A tool for facilitating a connection to an exposed end of a coaxial cable having an outer conductor having a lead end, an inner conductor defining a channel, and insulation disposed between the inner and outer conductors, the tool comprising:

a support;

a projection extending from the support and configured to be received by the channel of the inner conductor, the projection having a longitudinal axis; and a protrusion extending from the support and configured to displace insulation from the lead end of the outer conductor when the projection is received by the channel of the inner conductor, the protrusion being arcuate about the longitudinal axis of the projection and extending along the longitudinal axis a distance substantially equal to the desired depth of insulation to be removed; and the support, projection and protrusion being removable from the exposed end of the coaxial cable following displacement of the insulation.

* * * * *